US007181555B2

(12) United States Patent
Sone

(10) Patent No.: US 7,181,555 B2
(45) Date of Patent: Feb. 20, 2007

(54) DATA COMMUNICATION APPARATUS, DATA COMMUNICATION METHOD, AND PROGRAM

(75) Inventor: Takuro Sone, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 368 days.

(21) Appl. No.: 10/093,299

(22) Filed: Mar. 7, 2002

(65) Prior Publication Data

US 2002/0128824 A1 Sep. 12, 2002

(30) Foreign Application Priority Data

Mar. 8, 2001 (JP) ............................ 2001-064926

(51) Int. Cl.
*G06F 13/42* (2006.01)

(52) U.S. Cl. ...................................... 710/105; 710/306

(58) Field of Classification Search ................ 710/105, 710/305–308, 310–315; 370/431, 458, 463, 370/391, 466–467

See application file for complete search history.

(56) References Cited

U.S. PATENT DOCUMENTS 5,933,430 A * 8/1999 Osakabe et al. ............ 370/463
6,088,364 A * 7/2000 Tokuhiro .................... 370/466
6,404,770 B1 * 6/2002 Fujimori et al. ............ 370/429

FOREIGN PATENT DOCUMENTS

| | | |
|---|---|---|
| JP | 05-075666 | 3/1993 |
| JP | 07-050703 | 2/1995 |
| JP | 9-116593 | 5/1997 |
| JP | 09-281961 | 10/1997 |
| JP | 10-031484 | 2/1998 |
| JP | 10-200582 | 7/1998 |

OTHER PUBLICATIONS

Japanese Office Action dated Sep. 7, 2006.

* cited by examiner

*Primary Examiner*—Rehana Perveen
*Assistant Examiner*—Clifford Knoll
(74) *Attorney, Agent, or Firm*—Harness, Dickey & Pierce, P.L.C.

(57) ABSTRACT

A data communication apparatus is provided, which is capable of properly transmitting and receiving data of low speed specifications such as MIDI data even via a transmission line of high speed specifications such as an IEEE 1394 serial bus, and hence capable of properly processing the data. The data communication apparatus transmits data to a data receiving apparatus having a data processing section that processes received data at a predetermined processing speed. Data to be transmitted is generated at a higher speed than the predetermined processing speed. The generated data is output at an output speed adjusted to the predetermined processing speed, and the output data is transmitted at a higher speed than the predetermined processing speed.

9 Claims, 5 Drawing Sheets

DATA COMMUNICATION APPARATUS, DATA COMMUNICATION METHOD, AND PROGRAM

BACKGROUND OF THE INVENTION

1. Field of the Invention

The present invention relates to a data communication apparatus and a data communication method in which data of low speed specifications are transmitted using a transmission line of high speed specifications, and a program for implementing the method.

2. Description of Related Art

Personal computers are generally equipped with an IEEE 1394 serial bus that is an interface of high speed specifications, or a USB (Universal Serial Bus) that is an interface of medium speed specifications, and data of low speed specifications such as MIDI (Musical Instrument Digital Interface) data are transmitted and received via these interfaces. For example, the data transfer rate of the IEEE 1394 serial bus is 100–400 Mbps, and the data transfer rate of the USB is approximately 10 Mbps. On the other hand, MIDI Standards prescribes that 8 bit data (including 1 bit for stop bit) should be transferred at a reference clock frequency of 31.25 kHz , that is, the data transfer rate is approximately 300 kbps.

When MIDI data are generated using a sequence program on a personal computer, complicated control change data or data of a number of channels exceeding 16 channels, that is, data whose required processing speed exceeds the above-mentioned reference clock according to MIDI Standards, can be frequently generated. Even such data whose required processing speed exceeds the reference clock according to MIDI Standards can be transmitted to an external apparatus using the IEEE 1394 serial bus or the USB. However, if the external apparatus is a so-called MIDI apparatus (an apparatus according to MDI Standards), it may fail to perfectly receive data transmitted thereto at a transfer rate in excess of the reference clock according to MIDI Standards. This can lead to inadequate data processing.

SUMMARY OF THE INVENTION

It is an object of the present invention to provide a data communication apparatus and a data communication method that are capable of properly transmitting and receiving data of low speed specifications such as MIDI data even via a transmission line of high speed specifications such as an IEEE 1394 serial bus, and hence capable of properly processing the data, and a program for implementing the method.

To attain above-described object, in a first aspect of the present invention, there is provided a data communication apparatus that transmits data to a data receiving apparatus having a data processing section that processes received data at a predetermined processing speed, comprising a data generating device that is capable of generating data to be transmitted, at a higher speed than the predetermined processing speed, a speed control device that outputs the generated data at an output speed adjusted to the predetermined processing speed, and a transmission device that transmits the output data at a higher speed than the predetermined processing speed.

According to the first aspect of the present invention, the speed control device limits data input to the transmission device according to the processing speed of the data processing section of the data receiving apparatus. The transmission device transmits data to the data processing section. The input of the data to the data processing section is adjusted to the processing speed of the data processing section. Thus, even if the data transfer rate is high, data is not supplied to the data processing section at a rate in excess of the processing capacity of the data processing section, and the data receiving apparatus will not fail to receive the transmitted data.

To attain the above object, in a second aspect of the present invention, there is provided a communication apparatus that transfers received data to a data receiving apparatus having a data processing section that processes the received data at a predetermined processing speed, comprising a receiving device that receives data to be processed by the data processing section at a higher speed than the predetermined processing speed, and a transfer device that transfers the data received by the receiving device to the data receiving apparatus at a speed adjusted to the predetermined processing speed.

According to the second aspect of the present invention, even when data is transmitted at a high speed to the data communication apparatus, the transfer device limits the speed at which the data is transferred to the data processing section of the data receiving apparatus. Thus, data is not supplied to the data receiving apparatus at a rate in excess of the processing capacity of the data processing section. Therefore, data of low speed specifications can be reliably transmitted and received using a communication line of high speed specifications without failure to receive the data by the data receiving apparatus.

Preferably, in the first aspect, the data generating device generates MIDI data, and the transmission device transmits the MIDI data via one of an IEEE1394 serial bus and a USB.

Also preferably, in the first aspect, the speed control device controls the output speed based on a predetermined clock.

Preferably, in the second aspect, the data is MIDI data, and the transfer device transmits the MIDI data via one of an IEEE1394 serial bus and a USB.

To attain the above object, in a third aspect of the present invention, there is provided a data communication method executed by a data communication apparatus that transmits data to a data receiving apparatus having a data processing section that processes received data at a predetermined processing speed, comprising a data generating step of generating data to be transmitted, at a higher speed than the predetermined processing speed, a speed control step of outputting the generated data at an output speed adjusted to the predetermined processing speed, and a transmission step of transmitting the output data at a higher speed than the predetermined processing speed.

To attain the above object, in a fourth aspect of the present invention, there is provided a data communication method executed by a data communication apparatus that transfers received data to a data receiving apparatus having a data processing section that processes the received data at a predetermined processing speed, comprising a receiving step of receiving data to be processed by the data processing section at a higher speed than the predetermined processing speed, and a transfer step of transferring the data received by the receiving device to the data receiving apparatus at a speed adjusted to the predetermined processing speed.

To attain the above object, in a fifth aspect of the present invention, there is provided a program executed by a data communication apparatus that transmits data to a data receiving apparatus having a data processing section that processes received data at a predetermined processing speed, comprising a data generating module for generating data to be transmitted, at a higher speed than the predetermined processing speed, a speed control module for outputting the generated data at an output speed adjusted to the predetermined processing speed, and a transmission module for transmitting the output data at a higher speed than the predetermined processing speed.

To attain the above object, in a sixth aspect of the present invention, there is provided a program executed by a data communication apparatus that transfers received data to a data receiving apparatus having a data processing section that processes the received data at a predetermined processing speed, comprising a receiving module for receiving data to be processed by the data processing section at a higher speed than the predetermined processing speed, and a transfer module for transferring the data received by the receiving device to the data receiving apparatus at a speed adjusted to the predetermined processing speed.

The above and other objects, features, and advantages of the invention will become more apparent from the following detailed description taken in conjunction with the accompanying drawings.

DETAILED DESCRIPTION OF PREFERRED EMBODIMENTS

The present invention will now be described in detail with reference to the drawings showing embodiments thereof.

Figure 1:
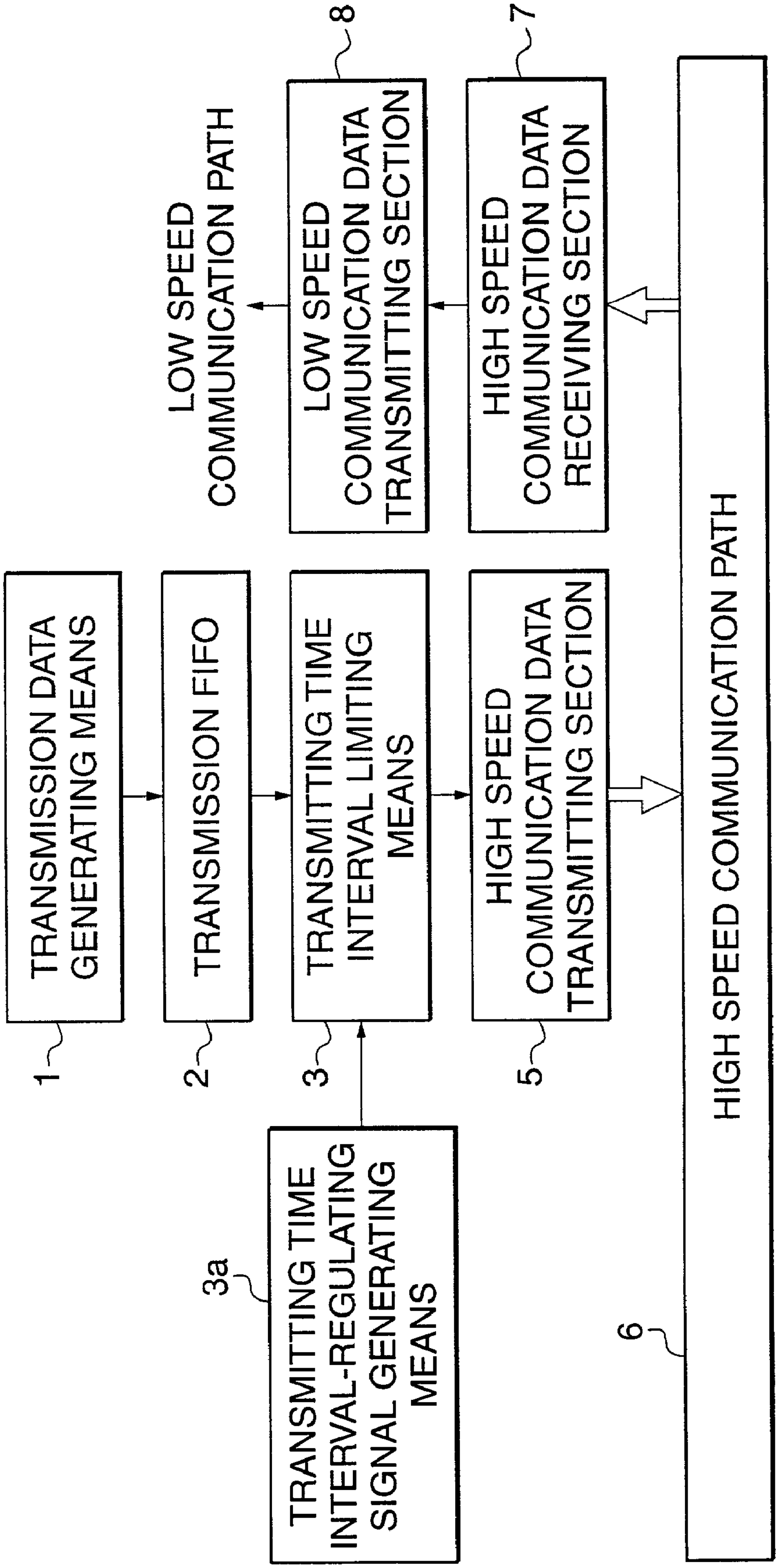
FIG. 1 is a block diagram showing the construction of a MIDI data transmitter-receiver system having a data communication apparatus according to an embodiment of the present invention.
Figure 2:
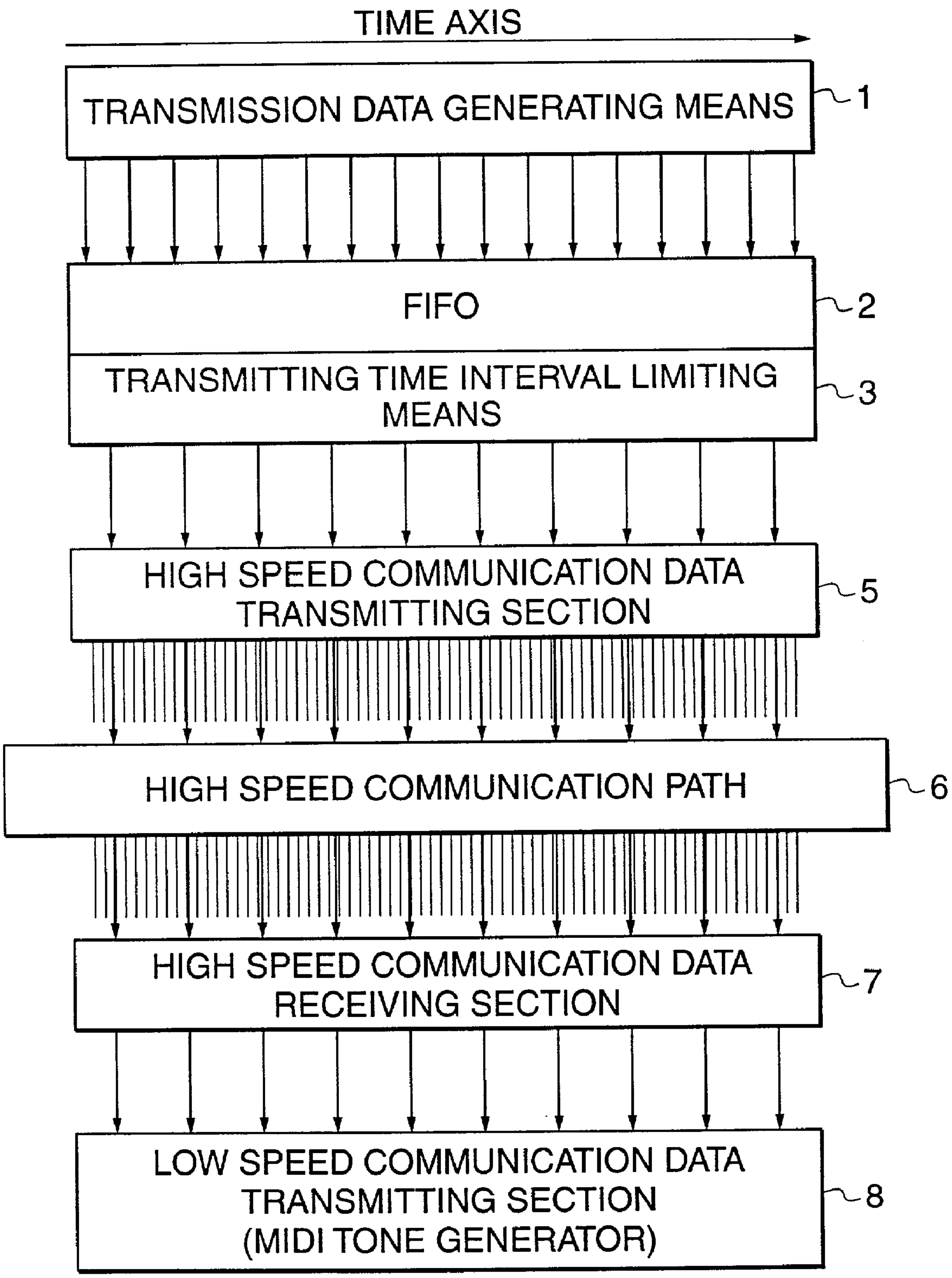
FIG. 2 is a view useful in explaining transmission and reception of data in the MIDI data transmitter-receiver system of FIG. 1.

FIG. 1 is a block diagram showing the construction of a MIDI data transmitter-receiver system having a data communication apparatus according to an embodiment of the present invention, and FIG. 2 is a view useful in explaining a method of limiting a data transfer rate in the data communication apparatus.

The data communication apparatus according to the present embodiment is adapted to transmit MIDI (Musical Instrument Digital Interface) data in an isochronous mode. The isochronous mode is a mode for transmitting data such as MIDI data without handshaking.

A transmission data generating means 1 is implemented, for example, by an automatic performance sequence program operating on a personal computer and having a function of generating MIDI data at a period shorter than the MIDI reference clock of 31.25 kHz (which corresponds to a period of 32 μ sec). Data (MIDI data) generated by the transmission data generating means 1 is buffered in a transmission FIFO 2. The data buffered in the transmission FIFO 2 is read out by a transmitting time interval limiting means 3 that controls the time interval of transmitting data, and is input to a high speed communication data transmitting section 5. A transmitting time interval-regulating signal generating means 3*a* that generates a data transmitting time interval-regulating signal, is connected to the transmitting time interval limiting means 3. The transmitting time interval limiting means 3 and the transmitting time interval-regulating signal generating means 3*a* may be each implemented by hardware, or alternatively, may be implemented by software that can operate on the personal computer. The transmission FIFO 2 may also be implemented by a RAM of the personal computer.

The transmitting time interval-regulating signal generating means 3*a* generates a 31.25 kHz clock pulse signal that is the reference clock according to MIDI Standards, and outputs it to the transmitting time interval limiting means 3. In accordance with the input clock pulse, the transmitting time interval limiting means 3 reads out the MIDI data buffered in the transmission FIFO 2, and delivers the MIDI data to the high speed communication data transmitting section 5 at time intervals corresponding to the input clock pulse.

The high speed communication data transmitting section 5, a high speed communication path 6 and a high speed communication data receiving section 7 constitute high speed communication means according to IEEE 1394 Standards, for example, and can transmit and receive data at a transfer rate of 100–400 Mbps, that is, several hundreds times as fast as the data transfer rate according to MIDI Standards. The high speed communication data transmitting section 5 transmits the MIDI data that is input from the transmitting time interval limiting means 3 to the high speed data receiving section 7 via the high speed communication path 6. Strictly speaking, this transmission and reception processing should be carried out such that the required frequency band is guaranteed so as to avoid variation of the data transfer rate. However, the transfer rate is much faster than the reference clock 31.25 kHz according to MIDI Standards, and therefore it can be considered that the processing is completed in an instant with no time lag.

The high speed communication data receiving section 7 receives the MIDI data sent from the high speed communication data transmitting section 5 via the high speed communication path 6, and delivers the data to a low speed communication data transmitting section 8. Here, the high speed communication data receiving section 7 and the low speed communication data transmitting section 8 constitute an apparatus separate from the above-mentioned apparatus (for example, a personal computer) including the communication data generating means 1. The low speed communication data transmitting section 8 buffers data that are input from the high speed communication data receiving section 7, converts the data into a data format according to MIDI Standards, and sends the same out to a low speed communication path, not shown, such as a MIDI interface. A MIDI tone generator or the like, not shown, is connected to the opposite end of the low speed communication path. The low speed communication data sanding section 8 corresponds to the data processing means (data processing section) of the present invention. A MIDI tone generator may be directly connected as the data processing means to the high speed communication data receiving section 7, while the low speed communication data sanding section 8 is omitted.

By thus limiting the communication speed on the transmitting side (transmitting time interval-regulating signal generating means 3*a* and transmitting time interval limiting means 3), MIDI data of low speed specifications are sent via the high speed communication path 6, and therefore the apparatus of low speed specifications on the receiving side can reliably receive the transmitted data without fail. The high speed communication path 6 is not limited to an IEEE 1394 serial bus, but may be a USB, or may be ISDN (Integrated Services Digital Network), ADSL (Asymmetric Digital Subscriber Line), or Ethernet or IEEE802.11 (so-called wireless LAN). The transmitted/received data is not limited to MIDI data.

The transmission data generating means 1 can generate data faster than the reference clock according to MIDI Standards. In general, data are not always generated continuously at a regular pace, but intermittently at time intervals. Thus, even if data are generated at a high rate, the accumulated data can be sent out while the data generation is interrupted, so that all data can be transmitted reliably without fail.

When first data is generated by the transmission data generating means 1 after interruption of the data generation and input via the transmission FIFO 2, the transmitting time interval limiting means 3 may reset the clock and start counting in timing of the first data being input, so as to minimize the time lag.

Figure 3:
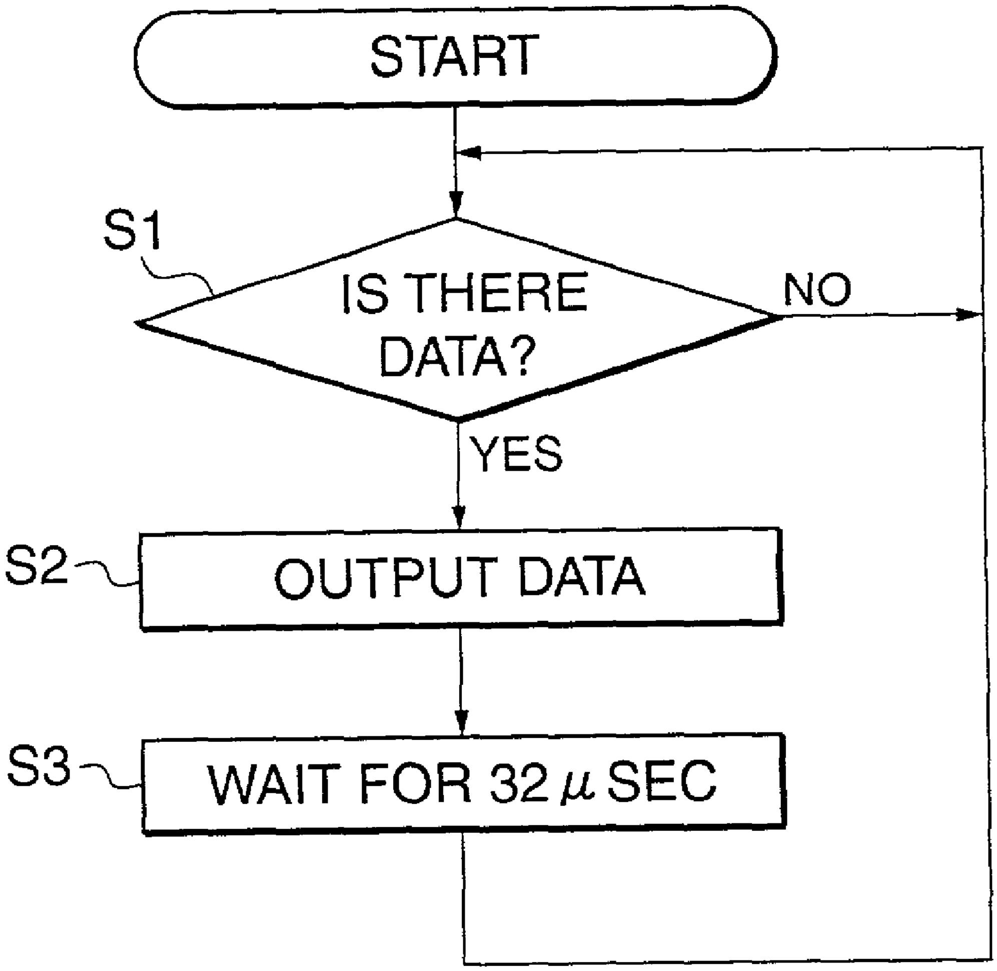
FIG. 3 is a flow chart showing the processing operation of transmitting time interval limiting means appearing in FIG. 2.

FIG. 3 is a flow chart showing the processing operation of the transmitting time interval limiting means 3 in FIG. 2. This processing operation is carried out when the clock is reset. In step S1, it is monitored whether or not there is data in the transmission FIFO 2. If there is no data in the transmission FIFO 2, the process waits for data to be generated. If there is data in (input to) the transmission FIFO 2, the data is immediately output to the high speed communication data transmitting section 5 (step S2). The clock can be reset by thus immediately outputting data when there is data in the transmission FIFO 2. That is, even if data is input that is not in synchronism with the clock, the clock may be reset so as to minimize the time lag. Then, after waiting for 32 μ sec to elapse so as to match with the MIDI reference clock, the process returns to step S1. In this flow chart, the processing in step S3 corresponds to the operation of the transmitting time interval-regulating signal generating means 3*a*.

As described above, according to the present embodiment, the transfer rate of data of low speed specifications that is generated at a high rate is regulated to a low rate before being sent to the high speed communication path, whereby failure to receive the transmitted data by the receiving side can be prevented. Alternatively, the transfer rate of data may be adapted to low-speed specifications on the receiving side of the high speed communication path, so that a large amount of data can be transmitted at a high rate via the high speed communication path. In this case, the data transfer rate of the high speed communication path need not be constant, so long as it is higher than that of a low speed communication path.

Figure 4:
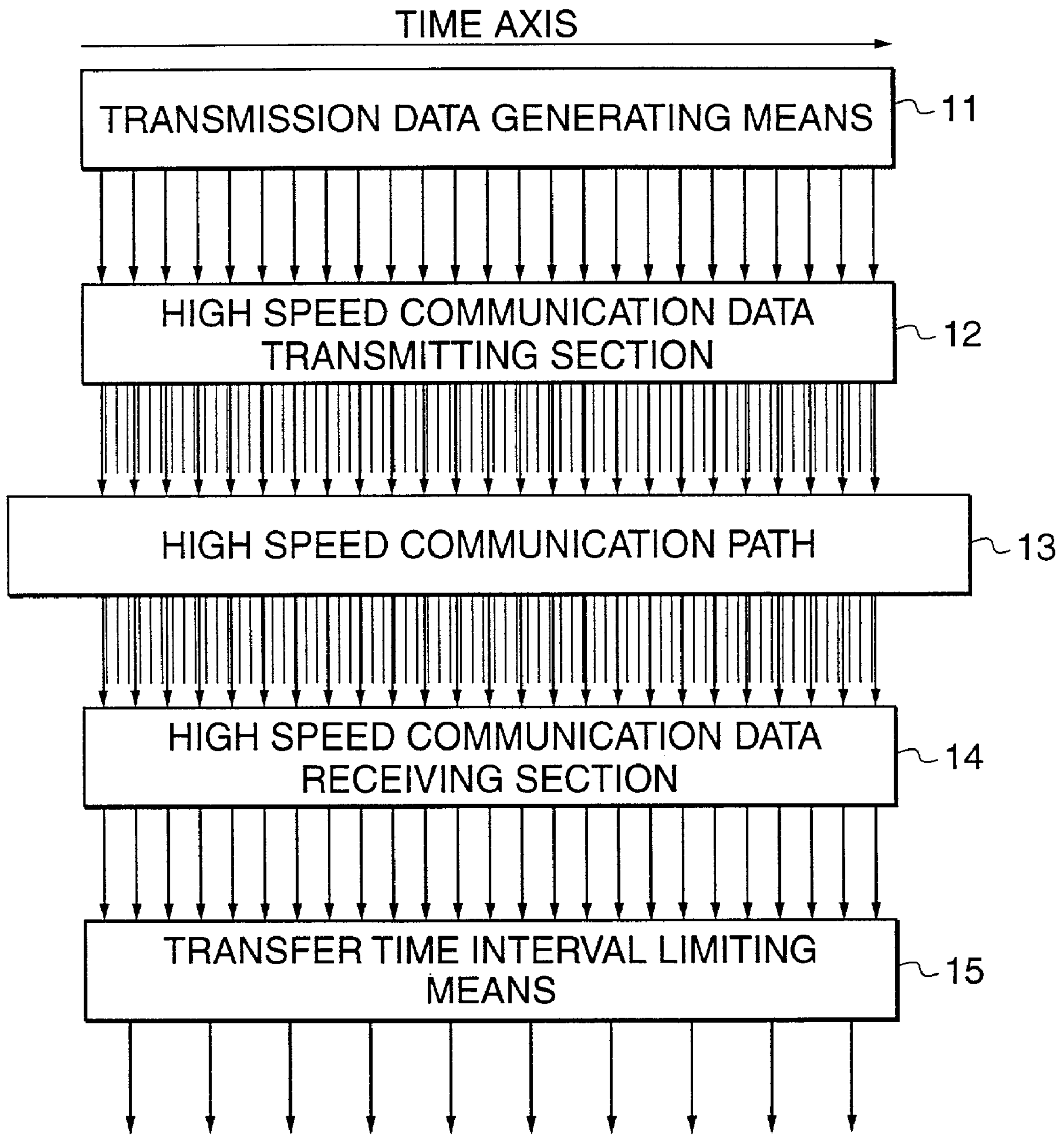
FIG. 4 is a view useful in explaining transmission and reception of data according to another embodiment of the present invention.

FIG. 4 shows data transmitting and receiving processing according to another embodiment of the present invention in which the transfer rate of data is adapted to low-speed specifications on the receiving side of the high speed communication path. A transmission data generating means 11 generates data (MIDI data) at a high rate. The term "high rate" used herein means a shorter period than the MIDI reference clock 31.25 kHz (period of 32 μ sec). The generated data is input as it is to a high speed communication data transmitting section 12. The high speed communication data transmitting section 12, a high speed communication path 13, and a high speed communication data receiving section 14 constitute communication means according to IEEE 1394 Standards, and have a data transfer rate of 100–400 Mbps. Therefore, the MIDI data which is input from the transmission data generating means 11 can be reliably delivered to the high speed communication data receiving section 14 without fail.

The high speed communication data receiving section 14 delivers the received data to a transfer time interval limiting means 15. The transfer time interval limiting means 15 includes a receiving buffer and a transfer time interval-regulating signal generating means, neither of which is shown. The transfer time interval limiting means 15 buffers MIDI data that is input at a high rate, and outputs the data at time intervals of 31.25 kHz which is the reference clock frequency according to MIDI Standards, the data being converted into a data format according to MIDI Standards.

By thus limiting the data transfer rate on the receiving side, even MIDI data of low speed specifications which are transmitted at a high rate via the high speed communication path 6 such as an IEEE 1394 serial bus can be received reliably without fail. Further, the data can be transferred in a format and at a rate according to MIDI Standards. The high speed communication path 6 is not limited to an IEEE1394 serial bus, but may be a USB, ISDN, ASDL, Ethernet or IEEE802.11 (so-called Wireless LAN). The transmitted/received data is not limited to MIDI data.

The transmission data generating means 11 can generate data faster than the reference clock according to MIDI Standards. In general, data are not always generated continuously at a regular pace, but intermittently at time intervals. Thus, even if data are generated at a high rate, the accumulated data can be sent out while the data generation is interrupted, so that all data can be transmitted reliably without fail.

When first data is generated by the high speed communication data receiving section 14 after interruption of the data generation and input, the transfer time interval limiting means 15 may reset the clock and start counting in timing of the first data being input, so as to minimize the time lag.

Figure 5:
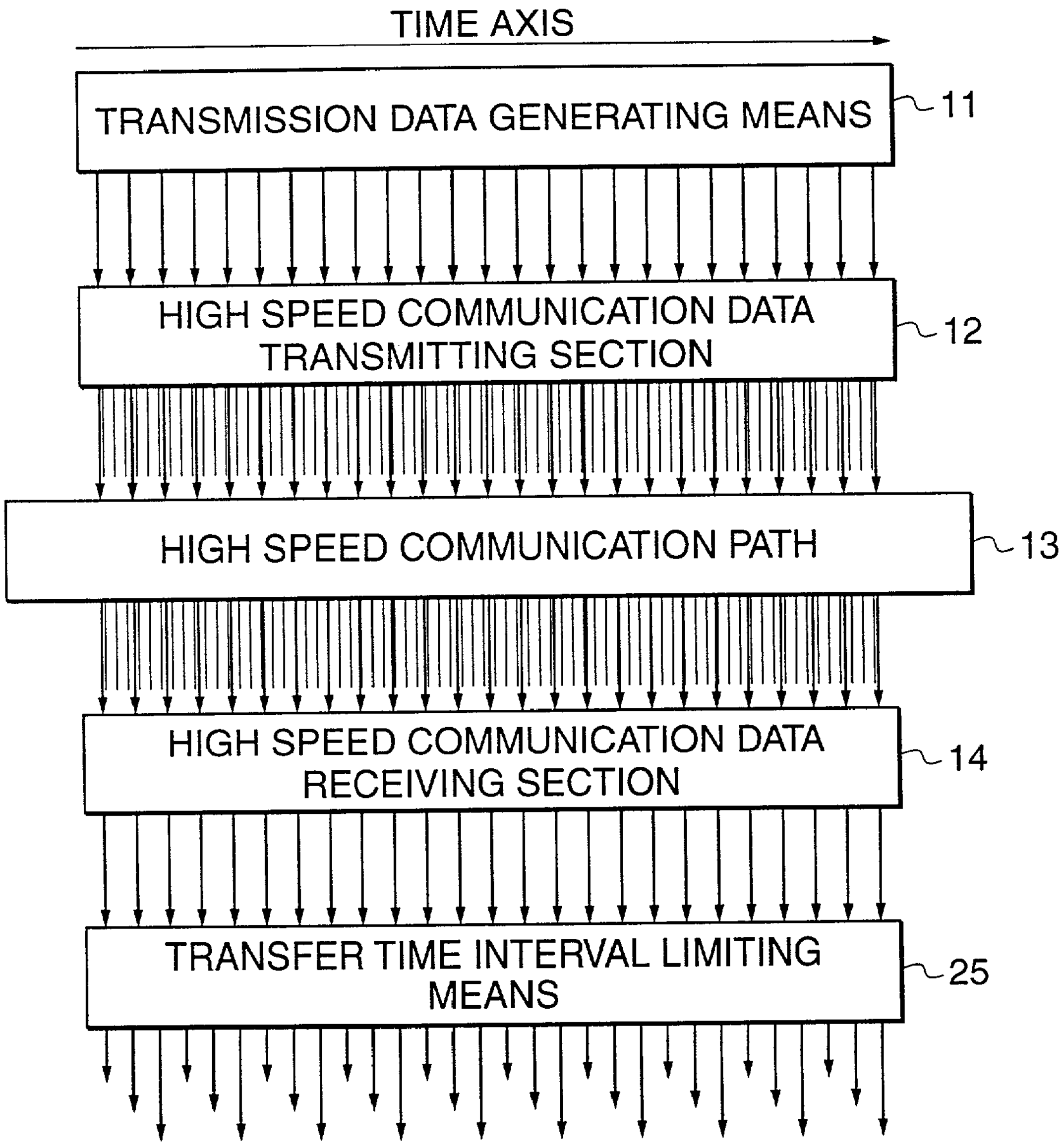
FIG. 5 is a view useful in explaining transmission and reception of data according to still another embodiment of the present invention.

In the arrangement shown in FIG. 4, the transfer time interval limiting means 15 may be provided with a plurality of output ports so that MIDI data that are input at a high rate are allotted to these output ports. FIG. 5 shows data transmitting and receiving processing according to still another embodiment of the present invention in which the transfer time interval limiting means is thus provided with a plurality of output ports. In FIG. 5, the high speed communication data receiving section 14 receives MIDI data from the high speed communication data transmitting section 12 via the high speed communication path 13 and delivers the data to a transfer time interval limiting means 25. The transfer time interval limiting means 25 converts the high speed MIDI data into data in a format according to MIDI Standards and outputs the converted data at a transfer rate limited to the MIDI reference clock of 31.25 kHz. At this time, the data are classified (for example, based on channels) into a plurality of lines, and the data classified into the lines are output at the reference frequency of 31.25 kHz. By thus classifying the data into a plurality of lines and outputting the classified data at 31.25 kHz, all the data can be processed by a plurality of low speed apparatuses to which the data are output.

In the above first-described embodiment, the clock generated by the transmitting time interval-regulating signal generating means 3*a* is assumed to be the reference clock (31.25 kHz) according to MIDI Standards. The clock generated by the transmitting time interval-regulating signal generating means 3*a* may be a clock having a frequency as high as 1/N of the reference clock (31.25 kHz). In this case, N MIDI signals are buffered and input to the high speed communication data transmitting section 5, and N MIDI signals that are transmitted via the high speed communication path 6 are decomposed on the receiving side, and are subjected to the same reception and transfer processing as in the above-described embodiment.

It is to be understood that the object of the present invention may also be accomplished by using a program as software which realizes the functions of the above described embodiment.

Further, it is to be understood that that the present invention may be implemented by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code read out from the storage medium realizes the functions of the above described embodiment, so that the storage medium storing the program code also constitutes the present invention.

The storage medium for supplying the program code may be, for example, a floppy disk, a hard disk, an optical disk, a magneto-optical disk, a CD-ROM, a CD-R, a magnetic tape, a non-volatile memory card, or a ROM. The program code may be supplied from a server computer through other MIDI equipment or communication network.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU, etc. provided in the expansion board or the expansion unit to perform a part or all of the actual operations based on instructions of the program code.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A data communication apparatus that transmits MIDI data to a data receiving apparatus having a processing section that processes MIDI data at the rate of a reference clock according to MIDI Standards, via a communication path which has a higher transfer rate than the rate of the reference clock according to MIDI Standards, comprising:

a data generating device that generates MIDI data at a higher rate than the rate of the reference clock according to MIDI Standards, and outputs the generated MIDI data;

an output controller that has a clock generator generating a clock at the rate of the reference clock according to MIDI Standards, and controls time intervals at which the generated MIDI data is outputted from said data generating device, based on the clock generated by said clock generator; and a transmission device that transmits the outputted MIDI data to the communication path having the higher transfer rate than the rate of the reference clock according to MIDI Standards;

wherein when outputting the MIDI data periodically by said data generating device is interrupted, and then resumed, said output controller controls said data generating device to immediately output first MIDI data to be output after interruption of outputting the MIDI data without being based on the clock generated by said clock generator.

2. A data communication apparatus that transfers received MIDI data from a communication path to a data receiving apparatus having a processing section that processes the received MIDI data at the rate of a reference clock according to MIDI Standards, the communication path having a higher transfer rate than the rate of the reference clock according to MIDI Standards, comprising:

a receiver that receives MIDI data from the communication path;

a transfer device that transfers the MIDI data received by said receiver to the data receiving apparatus; and a transfer controller that has a clock generator generating a clock at the rate of the reference clock according to MIDI Standards, and controls time intervals at which the MIDI data received by said receiver is transferred by said transfer device to said data receiving apparatus, based on the clock generated by said clock generator;

wherein when receiving the MIDI data periodically by said receiver is interrupted, and then resumed, said transfer controller controls said transfer device to immediately transfer fist MIDI data to be transferred after interruption of receiving the MIDI data without being based on the clock generated by said clock generator.

3. A data communication apparatus according to claim 1, wherein said transmission device transmits the MIDI data via one of an IEEE1394 serial bus and a USB.

4. A data communication apparatus according to claim 2, wherein said receiver receives the MIDI data from one of an IEEE1394 serial bus and a USB.

5. A data communication method executed by a data communication apparatus that transmits MIDI data to a data receiving apparatus having a processing section that processes MIDI data at the rate of a reference clock according to MIDI Standards, via a communication path which has a higher transfer rate than the rate of the reference clock according to MIDI Standards, comprising:

a data generating step of generating MIDI data at a higher rate than the rate of the reference clock according to MIDI Standards, and outputting the generated MIDI data;

a clock generating step of generating a clock at the rate of the reference clock according to MIDI Standards;

an output control step of controlling time intervals at which the generated MIDI data is outputted from said data generating step based on the clock generated in said clock generated step; and a transmission step of transmitting the outputted MIDI data to the communication path having the higher transfer rate than the rate of the reference clock according to MIDI Standards;

wherein when outputting the MIDI data periodically in said data generating step is interrupted, and then resumed, said out put controlling step controls said data generator step to immediately output first MIDI data to be output after interruption of outputting the MIDI data without being based on the clock generated in said clock generating step.

6. A data communication method executed by a data communication apparatus that transfers received MIDI data from a communication path to a data receiving apparatus having a processing section that processes the received MIDI data at the rate of a reference clock according to MIDI Standards, the communication path having a higher transfer rate than the rate of the reference clock according to MIDI Standards, comprising:

a receiving step of receiving MIDI data from the communication path;

a clock generating step of generating a clock at the rate of the reference clock according to MIDI Standards; and a transfer step of transferring the MIDI data received in said receiving step to the data receiving apparatus; and a transfer controlling step of controlling time intervals at which the MIDI data received in said receiving step is transferred to the data receiving apparatus, based on the clock generated in said clock generator step;

wherein when receiving the MIDI data periodically in said receiving step is interrupted, and then resumed, said transfer controlling step controls said transfer step to immediately transfer first MIDI data to be transferred after interruption of receiving the MIDI data without being based on the clock generated in said clock generating step.

7. A program executed by a data communication apparatus that transmits MIDI data to a data receiving apparatus having a processing section that processes MIDI data at the rate of a reference clock according to MIDI Standards, via a communication path which has a higher transfer rate than the rate of the reference clock according to MIDI Standards, comprising:

a data generating module for generating MIDI data at a higher rate than the rate of the reference clock according to MIDI Standards, and outputting the generated MIDI data;

a clock generating module for generating a clock at the rate of the reference clock according to MIDI Standards;

an output controlling module for controlling time intervals at which the generated MIDI data is outputted by said data generating module, based on the clock generated by said clock generating module; and a transmission module for transmitting the outputted MIDI data to the communication path having the higher transfer rate than the rate of the reference clock according to MIDI Standards;

wherein when outputting the MIDI data periodically by said data generating module is interrupted, and then resumed, said output controlling module controls said data generating module to immediately output first MIDI data to be output after interruption of outputting the MIDI data without being based on the clock generated by said clock generating module.

8. A program executed by a data communication apparatus that transfers received MIDI data from a communication path to a data receiving apparatus having a data processing section that processes the received MIDI data at the rate of a reference clock according to MIDI Standards, the communication path having a higher transfer rate than the rate of the reference clock according to MIDI Standards, comprising:

a receiving module for receiving MIDI data from the communication path;

a clock generating module for generating a clock at the rate of the reference clock according to MIDI Standards; and a transfer module for transferring the MIDI data received by said receiving module to the data receiving apparatus; and a transfer controlling module for controlling time intervals at which the MIDI data received by said receiving module is transferred to the data receiving apparatus, based on the clock generated by said clock generating module;

wherein when receiving the MIDI data periodically by said receiving module is interrupted, and then resumed, said transfer controlling module controls said transfer module to immediately transfer first MIDI data to be transferred after interruption of receiving the MIDI data without being based on the clock generated by said clock generating module.

9. A data communication apparatus according to claim 1, wherein when said output controller controls said data generating device to immediately Output first MIDI data to be output after interruption of outputting the MIDI data, said output controller resets the clock generated at the rate of the reference clock according to MIDI Standards by said clock generator.

* * * * *